United States Patent
Kawaguchi (10) Patent No.: US 9,462,144 B2
(45) Date of Patent: Oct. 4, 2016

(54) DISPLAY PROCESSING DEVICE, IMAGE FORMING APPARATUS, AND DISPLAY PROCESSING METHOD

(71) Applicant: KYOCERA Document Solutions Inc., Osaka (JP)

(72) Inventor: Shinichi Kawaguchi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/833,489

(22) Filed: Aug. 24, 2015

(65) Prior Publication Data

US 2016/0065763 A1 Mar. 3, 2016

(30) Foreign Application Priority Data

Sep. 3, 2014 (JP) .................................. 2014-179126

(51) Int. Cl.
| | |
|---|---|
| *H04N 1/00* | (2006.01) |
| *G06F 3/0488* | (2013.01) |
| *G06F 3/0485* | (2013.01) |
| *G06F 3/0484* | (2013.01) |
| *G06F 3/0481* | (2013.01) |

(52) U.S. Cl.
CPC ........ *H04N 1/00469* (2013.01); *G06F 3/0481* (2013.01); *G06F 3/0485* (2013.01); *G06F 3/04845* (2013.01); *G06F 3/04883* (2013.01); *H04N 1/0044* (2013.01); *H04N 1/00392* (2013.01); *G06F 2203/04806* (2013.01); *H04N 2201/0094* (2013.01)

(58) Field of Classification Search
USPC .......................................................... 358/1.2
See application file for complete search history.

(56) References Cited

U.S. PATENT DOCUMENTS

| | | | | |
|---|---|---|---|---|
| 2010/0027060 | A1* | 2/2010 | Ogino ................ | H04N 1/00411 358/1.15 |
| 2010/0085602 | A1* | 4/2010 | Okada ................ | H04N 1/00411 358/1.18 |
| 2010/0328232 | A1* | 12/2010 | Wood .................... | G06F 3/0488 345/173 |
| 2011/0317105 | A1* | 12/2011 | Miyazaki .............. | G02F 1/1343 349/106 |
| 2012/0044169 | A1* | 2/2012 | Enami ..................... | G06F 3/041 345/173 |
| 2014/0056475 | A1* | 2/2014 | Jang ........................ | G06K 9/18 382/103 |
| 2015/0009217 | A1* | 1/2015 | Yamamoto ................ | G06T 3/40 345/428 |

FOREIGN PATENT DOCUMENTS

JP 2007-166099 A 6/2007

* cited by examiner

*Primary Examiner* — Ngon Nguyen
(74) *Attorney, Agent, or Firm* — Studebaker & Brackett PC (57) ABSTRACT

A display processing device includes a display section, a touch location acquiring section, a magnification determining section, and an enlarging and displaying section. The display section has a display surface and displays a preview image based on image data. The touch location acquiring section acquires a touch location where a user touches the display surface. The magnification determining section determines a magnification based on the touch location. The enlarging and displaying section enlarges the preview image at the magnification to obtain an enlarged preview image and causes the display section to display a portion of the enlarged preview image.

14 Claims, 9 Drawing Sheets

DISPLAY PROCESSING DEVICE, IMAGE FORMING APPARATUS, AND DISPLAY PROCESSING METHOD

INCORPORATION BY REFERENCE

The present application claims priority under 35 U.S.C. §119 to Japanese Patent Application No. 2014-179126, filed on Sep. 3, 2014. The contents of this application are incorporated herein by reference in their entirety.

BACKGROUND

The present disclosure relates to a display processing device, an image forming apparatus, and a display processing method.

A recent known image forming apparatus such as a multifunction peripheral can display on a display section thereof a preview image of a printing result to be obtained based on image data by a preview function. Such an image forming apparatus includes a storage area where pieces of image data are accumulated and is capable of displaying on the display section a list of file names of the accumulated pieces of image data. Upon a user selecting a file name from the list of the file names, the image forming apparatus displays on the display section a preview image of a piece of image data corresponding to the file name selected. The preview image allows the user to visually check the preview image and decide whether or not the piece of image data desired to be printed has been selected. However, like other generic image forming apparatuses, the display section of the image forming apparatus is small, and therefore the size of the preview image that is displayed on the display section is small. The user is therefore sometimes unable to decide whether or not the piece of image data desired to be printed has been selected only by visually checking the preview image. In order to solve such a problem, an image forming apparatus has been desired that can display an enlarged preview image obtained by enlarging the preview image.

An image forming apparatus displays a portion of an enlarged preview image obtained by enlarging a preview image. More specifically, the image forming apparatus generates enlargement image data based on image data that is input, and stores the generated enlargement image data in a storage area. Upon receiving an instruction from a user to display an enlarged preview image, the image forming apparatus retrieves the enlargement image data prestored in the storage area to display a portion of the enlarged preview image on a display section.

SUMMARY

A display processing device according to the present disclosure includes a display section, a touch location acquiring section, a magnification determining section, and an enlarging and displaying section. The display section has a display surface and displays a preview image based on image data. The touch location acquiring section acquires a touch location where a user touches the display surface. The magnification determining section determines a magnification based on the touch location. The enlarging and displaying section enlarges the preview image at the magnification to obtain an enlarged preview image and causes the display section to display a portion of the enlarged preview image.

An image forming apparatus according to the present disclosure includes a storage section, the above-described display processing device, and an image forming section. The storage section stores image data therein. The display processing device displays a preview image based on the image data. The image forming section forms an image based on the image data.

A display processing method according to the present disclosure includes: causing a display section to display a preview image based on image data; acquiring a touch location at which a user touches a display surface of the display section; determining a magnification based on the touch location; and enlarging the preview image at the magnification to obtain an enlarged preview image and causing the display section to display a portion of the enlarged preview image.

DETAILED DESCRIPTION

Hereinafter, embodiments of a display processing device, an image forming apparatus, and a display processing method according to the present disclosure will be described with reference to the accompanying drawings. It should be noted that elements in the drawings that are the same or equivalent are labelled using the same reference signs and description thereof is not repeated.

First Embodiment

Figure 1:
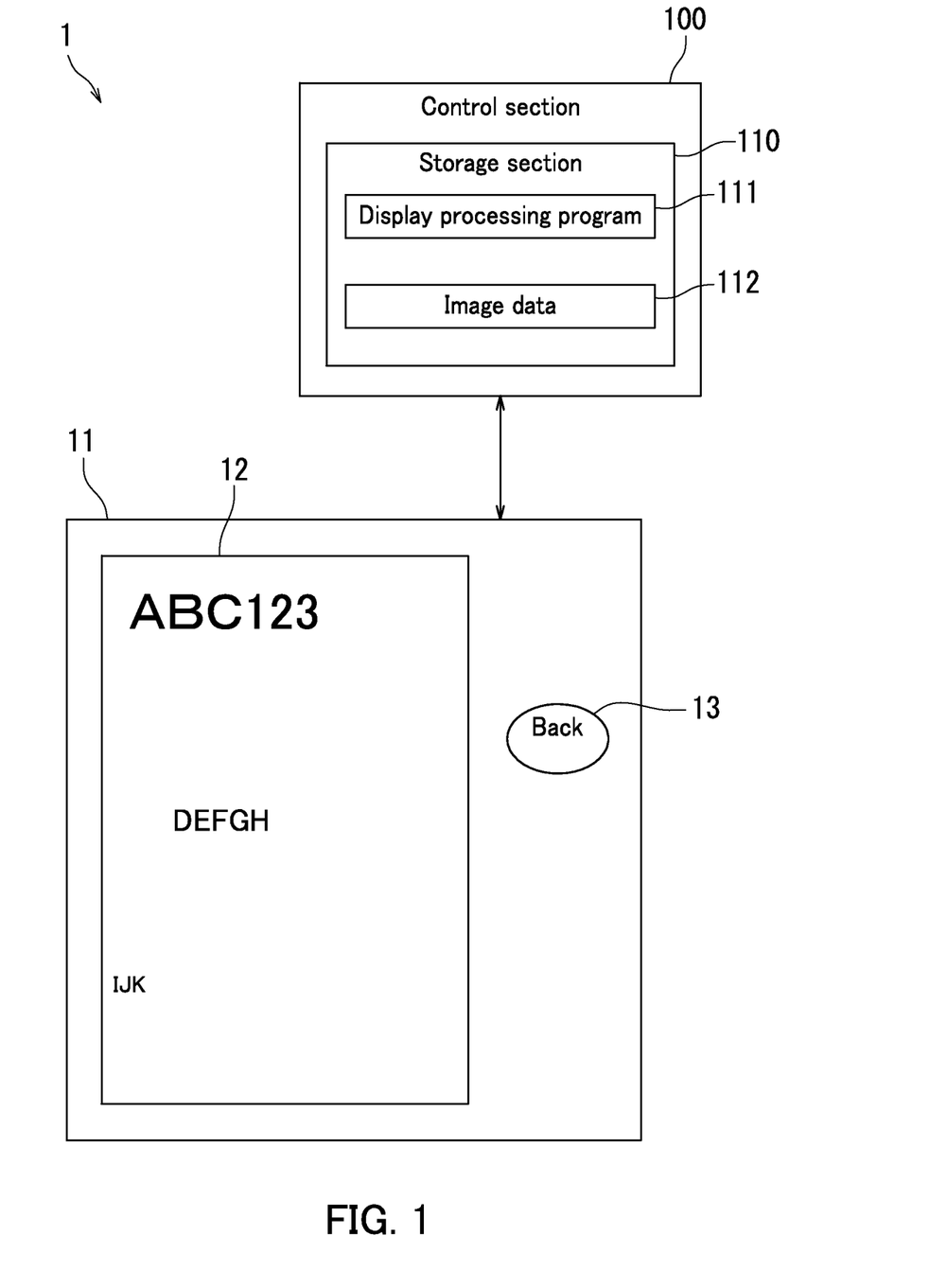
FIG. 1 is a schematic view illustrating a display processing device according to a first embodiment of the present disclosure.

FIG. 1 is a schematic view illustrating a display processing device according to the first embodiment of the present disclosure.

As illustrated in FIG. 1, a display processing device 1 includes a control section 100 and a touch panel 11. The touch panel 11 is an example of the display section.

The control section 100 has a storage section 110. The storage section 110 stores therein a display processing program 111 and one or more pieces of image data 112. The storage section 110 includes a hard disk drive (HDD), random access memory (RAM), and read only memory (ROM). The control section 100 controls operation of each element of the display processing device 1 by executing the display processing program 111.

The touch panel 11 displays a button image 13 and a preview image 12 based on image data. The touch panel 11 also displays a list of file names of the pieces of image data 112 stored in the storage section 110 and results of various processes that are performed by the control section 100. The touch panel 11 has a display surface. In response to a user touching (pressing) the display surface, the touch panel 11 sends a signal according to a location of the touch to the control section 100. The method of sensing a touch on the touch panel 11 is not particularly limited. For example, the touch sensing method may be a resistive film method or an electrostatic capacitance method.

The preview image 12 is displayed on the touch panel 11 by a preview function. More specifically, the preview image 12 is an image representing a printing result to be obtained based on a piece of image data 112. The preview image 12 is for example an image representing an image (printing result) to be printed on one side of a sheet of A4 paper. In response to a user selecting a file name from the list of the file names of the pieces of image data 112 displayed on the touch panel 11, the touch panel 11 displays the preview image 12 corresponding to the file name selected. In response to a user touching the button image 13, the control section 100 executes a prescribed process associated with a display location of the button image 13. That is, the button image 13 is an image for receiving input to the display processing device 1. In the present embodiment, a process to return to a previous screen is performed in response to a user touching the button image 13.

Figure 2:
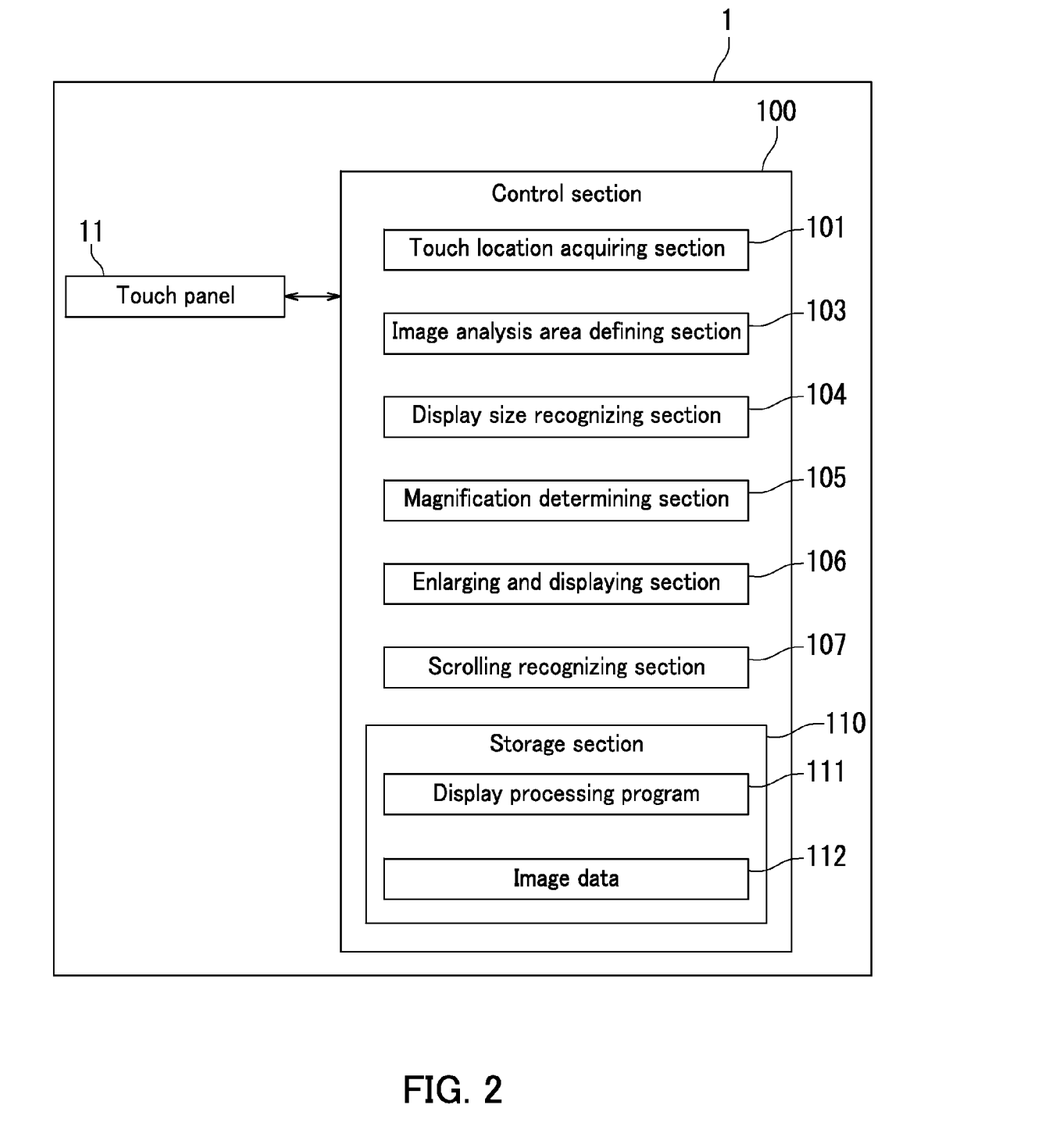
FIG. 2 is a block diagram of the display processing device according to the first embodiment of the present disclosure.

Next, the control section 100 will be described in detail with reference to FIGS. 1 and 2. FIG. 2 is a block diagram of the display processing device 1. More specifically, FIG. 2 illustrates configuration of the control section 100 for displaying an enlarged preview image.

As illustrated in FIG. 2, the control section 100 includes, in addition to the storage section 110, a touch location acquiring section 101, an image analysis area defining section 103, which is an example of the area defining section, a display size recognizing section 104, a magnification determining section 105, and an enlarging and displaying section 106.

The touch location acquiring section 101 acquires coordinates of a location of a touch by a user on the display surface of the touch panel 11 based on a signal sent from the touch panel 11.

The image analysis area defining section 103 defines an image analysis area within the preview image based on the touch location. The image analysis area is an area on the preview image 12 where the image is analyzed. More specifically, in response to a user touching the display surface of the touch panel 11 while the preview image 12 is being displayed on the touch panel 11, the image analysis area defining section 103 defines an image analysis area based on the touch location. In the present embodiment, the image analysis area defining section 103 defines the image analysis area stretching from the touch location.

The display size recognizing section 104 recognizes a display size of a character image on the touch panel 11 that is included in the image analysis area. That is, the display size recognizing section 104 recognizes a display size of a character image on the preview image 12 displayed on the touch panel 11. In the present embodiment, a display size of a character image located closest to the touch location in the image analysis area is recognized.

The magnification determining section 105 determines a magnification at which the preview image 12 is enlarged based on the touch location. In the present embodiment, the magnification determining section 105 determines a magnification based on the display size recognized by the display size recognizing section 104. More specifically, the magnification determining section 105 determines the magnification so that the character image located closest to the touch location within the image analysis area is displayed in a prescribed size on the touch panel 11. In the present embodiment, the display size and the prescribed size are sizes of the character image in a top-bottom direction. The prescribed size is prestored in the storage section 110. For example, 2 cm (approximately 200 pixels in a 300 dpi resolution) is prestored as the prescribed size.

The enlarging and displaying section 106 displays on the touch panel 11 a portion of an enlarged preview image obtained by enlarging the preview image 12 at the magnification determined by the magnification determining section 105.

More specifically, after the magnification determining section 105 determines a magnification, the enlarging and displaying section 106 generates image data (hereinafter, may be referred to as enlargement image data) for forming the enlarged preview image based on the magnification determined. The enlargement image data generated is temporarily stored in the RAM. The enlarging and displaying section 106 defines an area (display area) on the enlarged preview image to be displayed on the touch panel 11. The display area on the enlarged preview image is defined based on the touch location. In the present embodiment, the enlarging and displaying section 106 defines the display area stretching from the touch location on the enlarged preview image. The enlarging and displaying section 106 displays on the touch panel 11 an image within the defined display area (a portion of the enlarged preview image). The display area that is defined with respect to the enlarged preview image varies according to the screen size (physical size) and the resolution of the touch panel 11.

The enlargement image data stored in the RAM is deleted from the RAM once the previous screen is displayed on the touch panel 11 in response to the button image 13 being touched. That is, once the enlarged preview image is switched to the preview image 12 on the touch panel 11, the enlargement image data is deleted from the RAM.

As described above, in the display processing device 1 according to the present embodiment, image data of an enlarged preview image to be obtained by enlarging the preview image 12 displayed on the touch panel 11 is generated and temporarily stored in the storage section 110 (RAM) in response to a user touching the touch panel 11. The display processing device 1 then displays on the touch panel 11 a portion of the enlarged preview image based on the enlargement image data stored in the storage section 110 (RAM). Once the enlarged preview image is switched to the preview image 12 on the touch panel 11, the enlargement image data is deleted from the RAM. Accordingly, the display processing device 1 does not need to store all together pieces of enlargement image data corresponding to the pieces of image data 112 stored in the storage section 110. That is, the display processing device 1 only needs to store a piece of enlargement image data corresponding to a piece of image data 112 in the storage section 110. Thus, the present embodiment can reduce the storage required for the enlargement image data.

Figure 3:
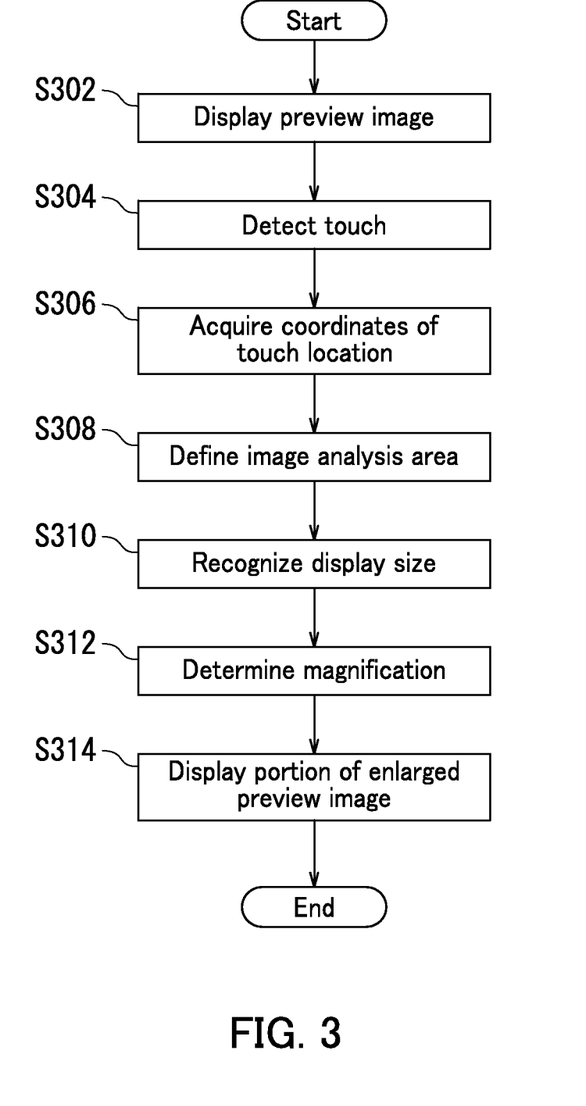
FIG. 3 is a flowchart illustrating operation of the display processing device according to the first embodiment of the present disclosure.

Next, operation of the display processing device 1 will be described with reference to FIGS. 1 to 3. In response to a user selecting a file name from the list of the file names of the pieces of image data 112 displayed on the touch panel 11, the control section 100 retrieves and executes the display processing program 111. Through the execution of the program, the display processing device 1 performs step S302 to step S314. As a result, the display processing device 1 displays on the touch panel 11 a portion of an enlarged preview image obtained by enlarging the preview image 12.

Step S302: In response to a user selecting a file name, the touch panel 11 displays the preview image 12 based on a piece of image data 112 corresponding to the file name selected.

Step S304: In response to the user touching the display surface of the touch panel 11 while the preview image 12 is being displayed on the touch panel 11, the touch panel 11 sends a signal according to a location of the touch to the control section 100.

Step S306: The touch location acquiring section 101 acquires coordinates of the location of the touch by the user on the display surface of the touch panel 11 based on the signal from the touch panel 11.

Step S308: The image analysis area defining section 103 defines an image analysis area based on the touch location.

Step S310: The display size recognizing section 104 recognizes a display size of a character image included in the image analysis area.

Step S312: The magnification determining section 105 determines a magnification so that a character image located closest to the touch location within the image analysis area is displayed in a prescribed size on the touch panel 11.

Step S314: The enlarging and displaying section 106 causes the touch panel 11 to display a portion of an enlarged preview image stretching from the touch location, whereupon the process comes to an end.

Figure 4A:
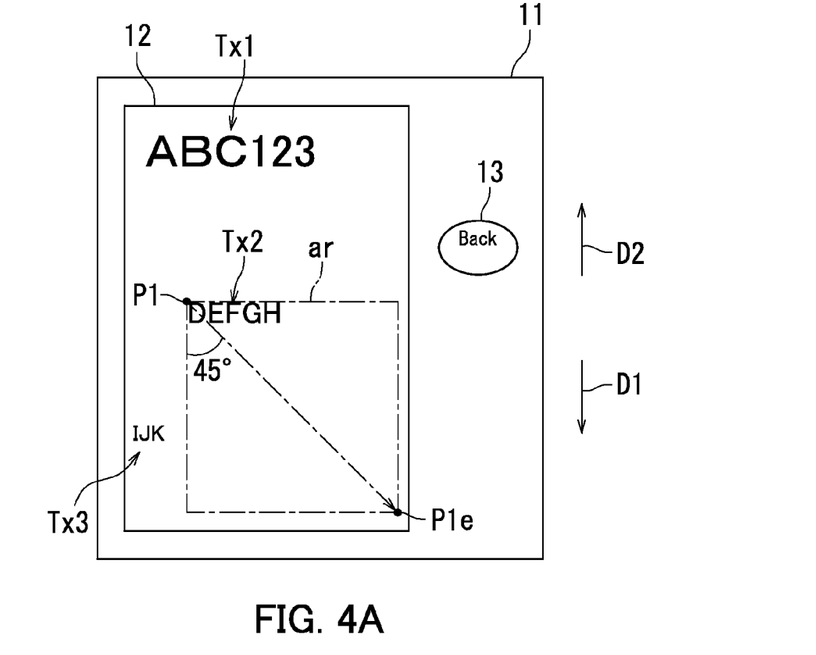
FIG. 4A is a diagram illustrating an example of a preview image according to the first embodiment of the present disclosure.
Figure 4B:
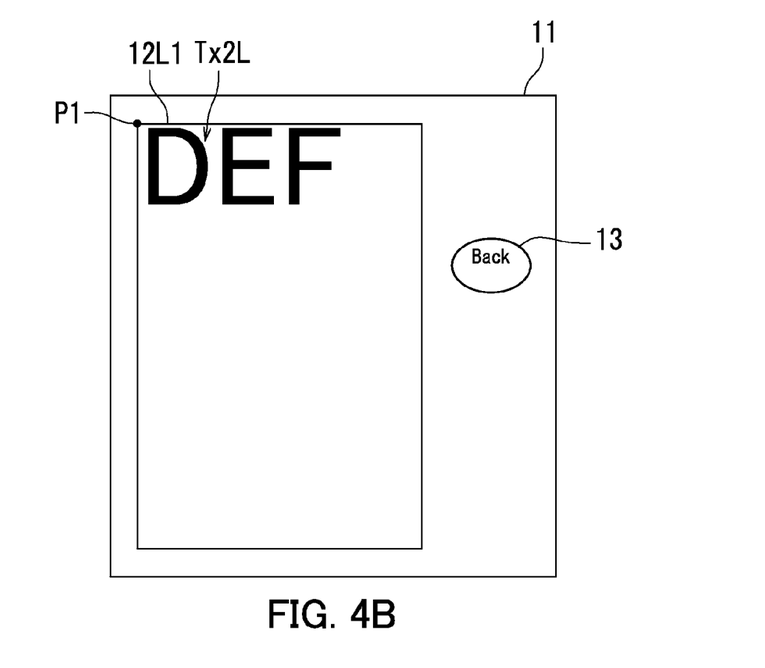
FIG. 4B is a diagram illustrating an example of an enlarged displayed image obtained by enlarging the preview image illustrated in FIG. 4A.

Next, an example of a process to display an enlarged preview image will be described in detail with reference to FIGS. 1 to 4B. FIG. 4A is a diagram illustrating an example of the preview image 12. FIG. 4B is a diagram illustrating an example of an enlarged displayed image obtained by enlarging the preview image 12 illustrated in FIG. 4A. In order to facilitate understanding, a location P1e is not on an outer edge of the preview image 12 in the example illustrated in FIG. 4A.

In response to a user selecting a file name from the list of the file names of the pieces of image data 112 displayed on the touch panel 11, the touch panel 11 displays a preview image 12 of a piece of image data 112 corresponding to the selected file name as illustrated in FIG. 4A. The present embodiment will be described for the case where the preview image 12 includes three character string images Tx1 to Tx3. The character string image Tx1 represents a character string of "ABC123". The character string image Tx2 represents a character string of "DEFGH". The character string image Tx3 represents a character string of "IJK".

In response to the user touching a location P1 with a finger, the image analysis area defining section 103 defines an image analysis area ar stretching from the touch location P1 toward the lower right. In the example illustrated in FIG. 4A, the image analysis area ar is a rectangular area, one diagonal line of which is a straight line extending from the touch location P1 toward the lower right at 45 degrees. More specifically, the one diagonal line of the image analysis area ar extends from the touch location P1 as a starting point to a location (location P1e) as an ending point where a straight line extending from the touch location P1 toward the lower right at 45 degrees intersects with the outer edge of the preview image 12. Once the image analysis area ar is defined, the display size recognizing section 104 analyzes images within the image analysis area ar. Then, the display size recognizing section 104 recognizes a display size of a character image "D" located closest to the touch location P1 in the image analysis area ar.

Once the display size recognizing section 104 recognizes the display size of the character image "D", the magnification determining section 105 determines a magnification so that the character image "D" is displayed in a prescribed size on the touch panel 11. Subsequently, the enlarging and displaying section 106 generates image data for forming an enlarged preview image based on the magnification determined by the magnification determining section 105. The enlarging and displaying section 106 also defines a display area on the enlarged preview image stretching from the touch location P1. The enlarging and displaying section 106 then causes the touch panel 11 to display an image (a portion of the enlarged preview image) 12L1 included in the defined display area as illustrated in FIG. 4B. Hereinafter, the portion of the enlarged preview image to be displayed on the touch panel 11 may be referred to as an enlarged displayed image. In the example illustrated in FIG. 4B, the enlarged displayed image 12L1 is displayed. The enlarged displayed image 12L1 includes a character string image Tx2L in which a character string image "DEF" being a portion of the character string image Tx2 "DEFGH" is enlarged.

Figure 5A:
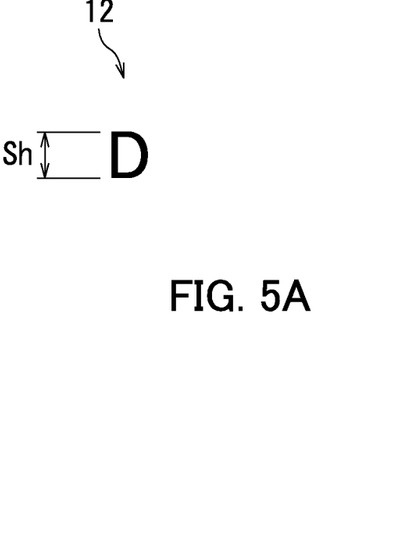
FIG. 5A is a diagram illustrating a display size of a character image included in the preview image according to the first embodiment of the present disclosure.
Figure 5B:
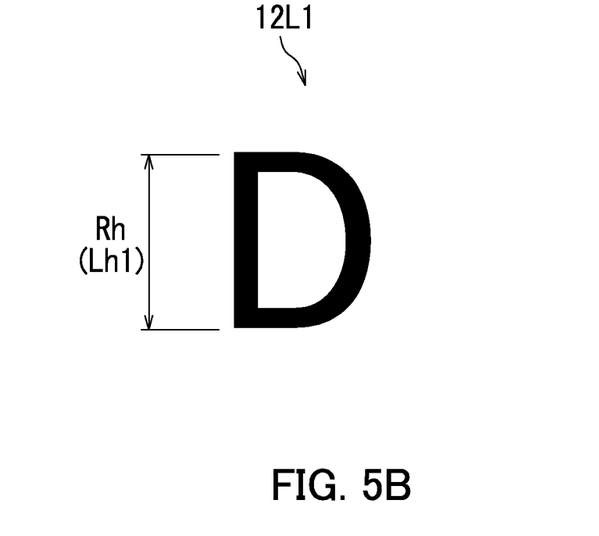
FIG. 5B is a diagram illustrating a display size of a character image included in the enlarged displayed image according to the first embodiment of the present disclosure.

Next, an example of a process to determine the magnification will be described in detail with reference to FIGS. 1 to 5B. FIG. 5A is a diagram illustrating a display size of the character image "D" included in the preview image 12 illustrated in FIG. 4A. FIG. 5B is a diagram illustrating a display size of the character image "D" included in the enlarged preview image (enlarged displayed image 12L1) illustrated in FIG. 4B. In the present embodiment, the magnification determining process will be described using a case as an example where the location P1 illustrated in FIG. 4A is touched and the display size recognizing section 104 recognizes the display size of the character image "D".

The display size of the character image "D" included in the preview image 12 is Sh in FIG. 5A, and the prescribed size is Rh. In this case, the magnification determining section 105 determines a magnification so that the character image "D" is displayed in the prescribed size Rh on the touch panel 11 as illustrated in FIG. 5B. That is, the magnification is determined so that the display size Lh1 of the character image "D" in the enlarged displayed image 12L1 is the prescribed size Rh. More specifically, the magnification Ra is calculated according to the following equation 1. In the equation 1, Rh represents the prescribed size, and Sh represents the display size of the character image located closest to the touch location P1 in the image analysis area ar among the character images displayed in the preview image 12.

$$Ra = Rh/Sh \times 100 \qquad \text{(Equation 1)}$$

Figure 6A:
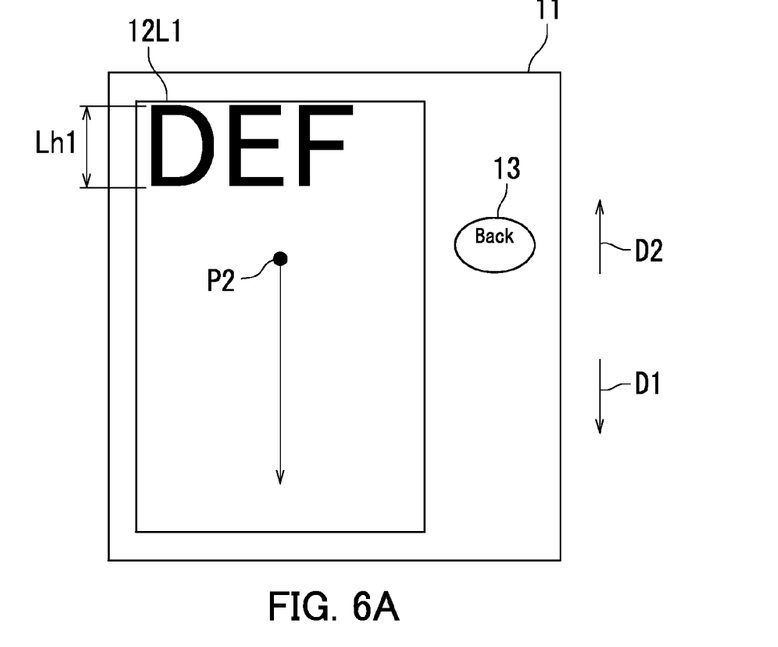
FIG. 6A is a diagram illustrating an example of the enlarged displayed image according to the first embodiment of the present disclosure.

Next, a process to display an enlarged image when scrolling operation is performed will be described with reference to FIGS. 1 to 6B. FIG. 6A is a diagram showing the enlarged displayed image 12L1 illustrated in FIG. 4B.

Figure 6B:
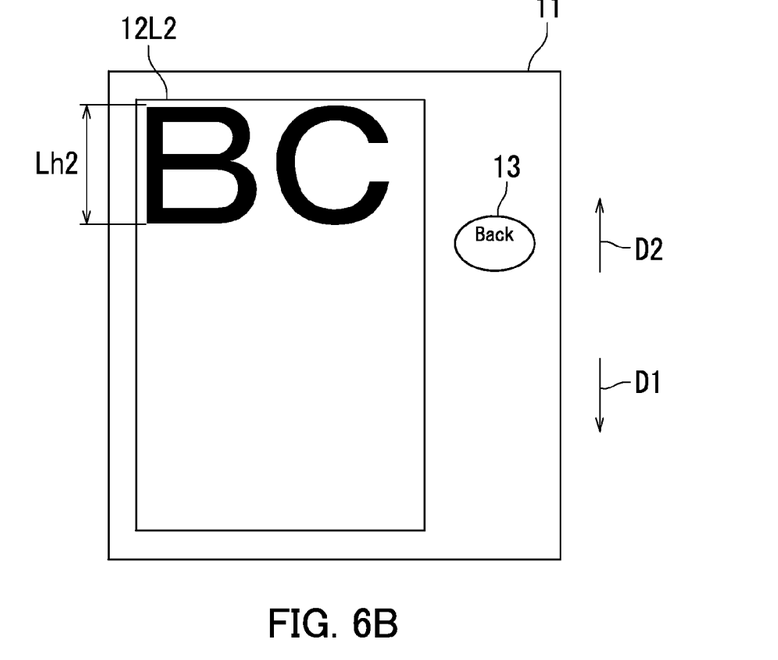
FIG. 6B is a diagram illustrating an example of an enlarged displayed image that is displayed on a touch panel as a result of scrolling operation.

FIG. 6B is a diagram illustrating an example of an enlarged displayed image 12L2 to be displayed on the touch panel 11 as a result of the scrolling operation. More specifically, FIG. 6B illustrates the touch panel 11 displaying an image of another area (enlarged displayed image 12L2) on the enlarged preview image after the display area in the enlarged preview image including the enlarged displayed image 12L1 illustrated in FIG. 6A is shifted as a result of the scrolling operation.

As illustrated in FIG. 2, the control section 100 further includes a scrolling recognizing section 107. The scrolling recognizing section 107 recognizes scrolling operation performed by a user. The scrolling operation refers to a motion of a finger moving from a location to a location on the touch panel 11 while keeping in contact (touch) with the touch panel 11 for sliding images.

For example, as illustrated in FIG. 6A, a user shifts the touch location with a finger kept in touch with the touch panel 11 in a direction indicated by allow D1 from a location P2 to another location while the enlarged displayed image 12L1 is being displayed on the touch panel 11. In response, the enlarging and displaying section 106 shifts the display area on the enlarged preview image in a direction indicated by arrow D2 (a direction opposite to the direction indicated by arrow D1) according to the scrolling operation recognized by the scrolling recognizing section 107. More specifically, the enlarging and displaying section 106 shifts the display area on the enlarged preview image according to an amount of the move of the touch location (distance by which the touch location is moved) and a direction in which the touch location is moved (direction indicated by arrow D1).

In the present embodiment, the character string image Tx1 including a character string "BC" is located above (to the direction indicated by arrow D2 relative to) the character string image Tx2 including a character string "DEF" as illustrated in FIG. 4A. Accordingly, several times of scrolling operation in the direction indicated by arrow D1 starting from the location P2 as illustrated in FIG. 6A causes the enlarged character string "BC" to be displayed on the touch panel 11 as illustrated in FIG. 6B.

As illustrated in FIG. 4A, the display size of the character string image Tx1 including the character string "BC" is larger than the display size of the character string image Tx2 including the character string "DEF" on the preview image 12. Accordingly, a display size Lh2 of the image of the character string "BC" illustrated in FIG. 6B is larger than a display size Lh1 of the image of the character string "DEF" illustrated in FIG. 6A.

Figure 7:
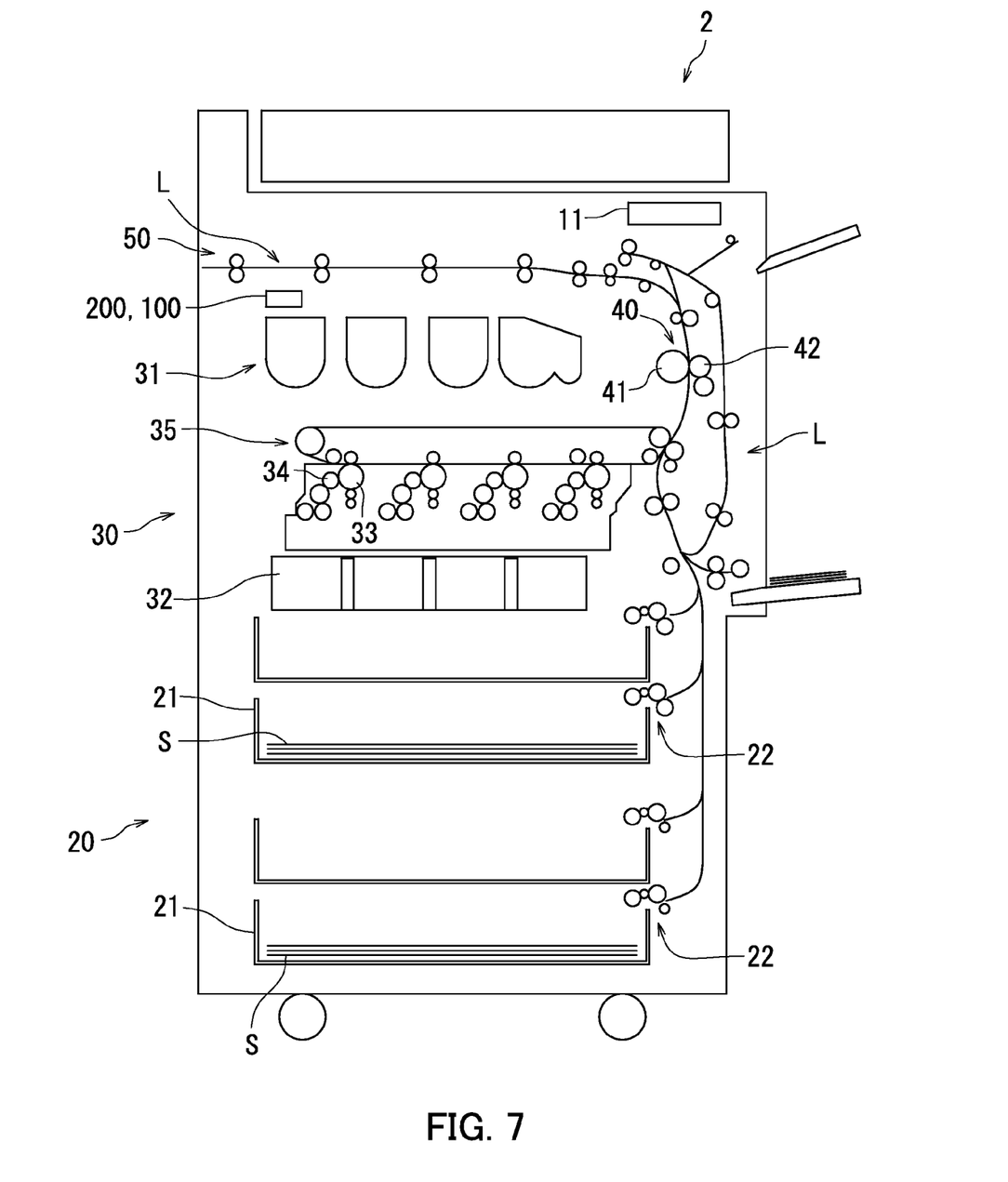
FIG. 7 is a schematic view illustrating an image forming apparatus according to the first embodiment of the present disclosure.

Next, an image forming apparatus including the display processing device 1 will be described with reference to FIGS. 1 to 7. FIG. 7 is a schematic view illustrating an image forming apparatus 2 according to the embodiment of the present disclosure.

As illustrated in FIG. 7, the image forming apparatus 2 includes a conveyance section L, a sheet feed section 20, an image forming section 30, a fixing section 40, an ejection section 50, and a control section 200. The control section 200 serves functions of the control section 100 of the display processing device 1 as well as its own functions. The image forming apparatus 2 includes the touch panel 11 of the display processing device 1.

The control section 200 controls operation of each section of the image forming apparatus 2. The control section 200 displays a preview image 12 and an enlarged preview image (enlarged displayed image) on the touch panel 11 as described with reference to FIGS. 1 to 6B.

The touch panel 11 is disposed in an upper part of a main body of the apparatus. The touch panel 11 displays a list of file names of pieces of image data 112 stored in a storage area of the control section 200. In response to a user selecting a file name from the list of the file names of the pieces of image data 112, the touch panel 11 displays a preview image 12 of a piece of image data 112 corresponding to the file name selected. In response to the user touching the display surface of the touch panel 11 while the preview image 12 is being displayed, the touch panel 11 displays a portion of an enlarged preview image (enlarged displayed image) obtained by enlarging the preview image 12. The user can easily determine whether or not the selected piece of image data 112 is the piece of image data 112 desired to be printed by visually checking the enlarged displayed image. The user may then request the image forming apparatus 2 to perform printing, whereupon the selected piece of image data 112 is printed out. The request for printing by the user is for example made through a hard key included in the image forming apparatus 2.

The conveyance section L conveys a sheet S from the sheet feed section 20 to the ejection section 50 via the fixing section 40.

The sheet feed section 20 has sheet feed cassettes 21 and sheet feed roller groups 22. Each of the sheet feed cassettes 21 can contain sheets S. Each of the sheet feed roller groups 22 feeds the sheets S contained in the corresponding one of the sheet feed cassettes 21 to the sheet conveyance section L one at a time. The sheets S are an example of a recording medium.

The image forming section 30 forms an image on a sheet S that is fed. The image forming section 30 includes a toner replenishment device 31, a light exposure device 32, photosensitive drums 33, development rollers 34, and a transfer device 35.

The toner replenishment device 31 replenishes the development rollers 34 with toner.

The light exposure device 32 irradiates the photosensitive drums 33 with laser light based on the piece of image data 112 requested by the user to be printed out. As a result, electrostatic latent images are formed on the photosensitive drums 33. The development rollers 34 supply toner to the photosensitive drums 33 to develop the electrostatic latent images. As a result, toner images are formed on the photosensitive drums 33.

The transfer device 35 transfers the toner images formed on the photosensitive drums 33 to the sheet S. The sheet S having the toner images transferred thereto is conveyed to the fixing section 40.

The fixing section 40 has a heat member 41 and a pressure member 42. The fixing section 40 applies heat and pressure to the sheet S using the heat member 41 and the pressure member 42 to fix the unfixed toner images on the sheet S.

The ejection section 50 ejects the sheet S out of the main body.

As described above, the image forming apparatus 2 includes the display processing device 1. That is, the image forming apparatus 2 includes the touch panel 11 of the display processing device 1. The image forming apparatus 2 also includes the control section 200 that serves functions of the control section 100 of the display processing device 1 as well as its own functions. The user can therefore cause the touch panel 11 to display a portion of an enlarged preview image obtained by enlarging the preview image 12 by touching the preview image 12. The user can therefore easily determine whether or not the selected piece of image data 112 is the piece of image data 112 desired to be printed.

The present embodiment includes one button image 13. However, the number of button images 13 is not limited and may be greater than one.

In the present embodiment, the button image 13 displayed on the touch panel 11 is associated with the "back to previous screen" process. However, the button image 13 may be associated with any process. For example, the button image 13 may be associated with a "redisplay" process.

In the present embodiment, the prescribed size Rh prestored in the storage section 110 is 2 cm. However, the prescribed size Rh is not limited to 2 cm. For example, the prescribed size Rh prestored in the storage section 110 may be 3 cm. In an alternative configuration, a user may store any prescribed size Rh in the storage section 110.

In the present embodiment, the display size and the prescribed size Rh are sizes of a character image in the top-bottom direction. However, the display size and the prescribed size Rh may be sizes of a character image in a left-right direction.

Second Embodiment

Next, a display processing device 1 according to the second embodiment of the present disclosure will be described with reference to FIGS. 1 to 9B. The second embodiment is different from the first embodiment in the starting point from which the image analysis area ar to be defined stretches. Hereinafter, the second embodiment will be described based on differences from the first embodiment and description of matter that is the same as for the first embodiment will be omitted.

Figure 8:
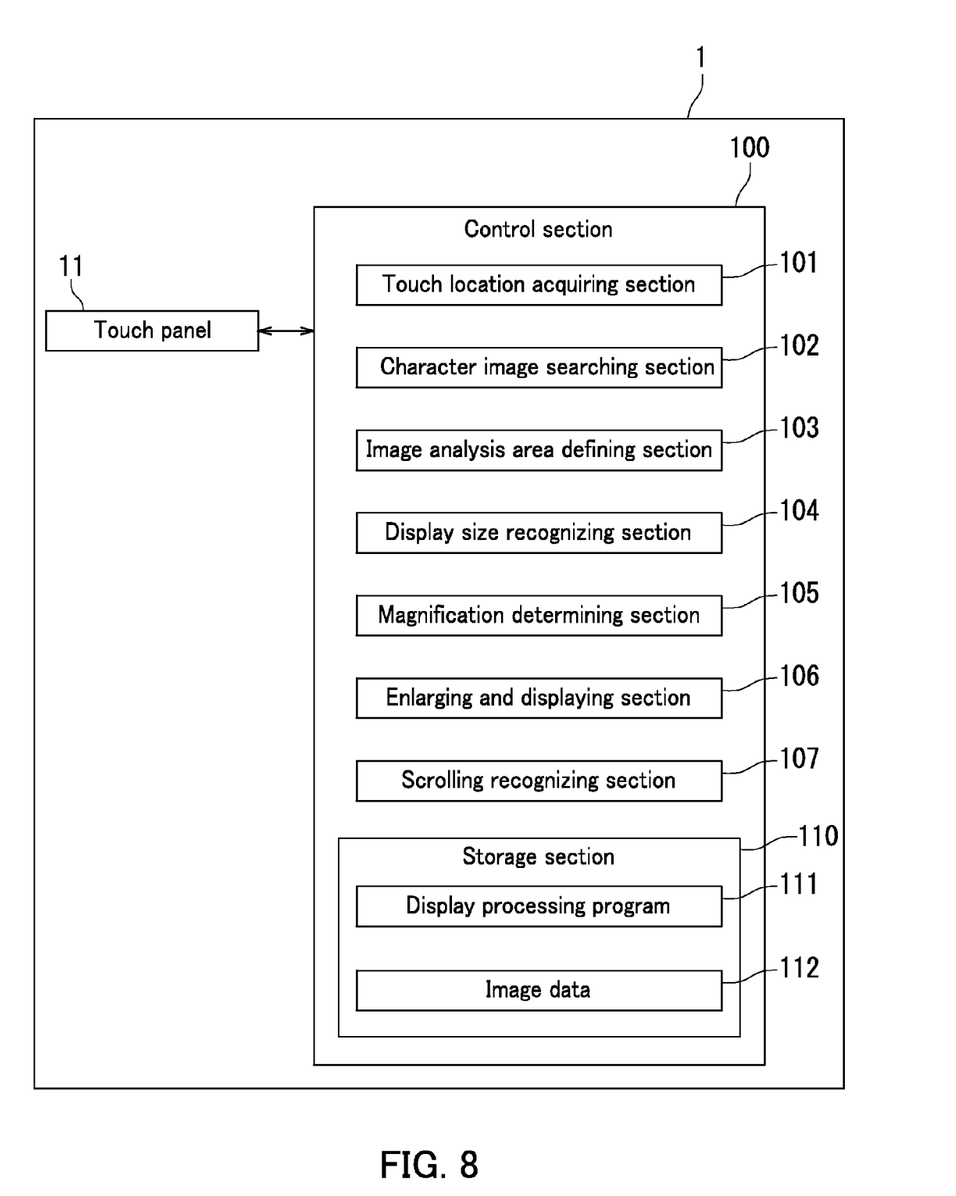
FIG. 8 is a block diagram illustrating a display processing device according to a second embodiment of the present disclosure.
Figure 9A:
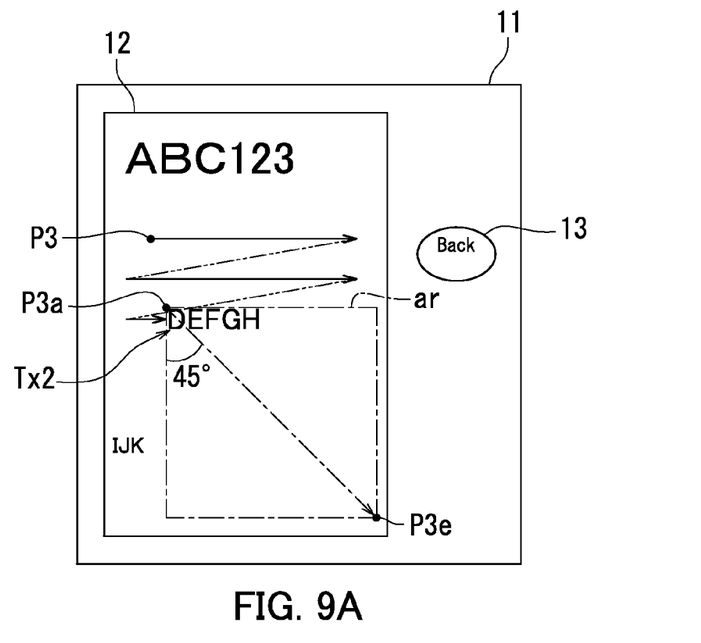
FIG. 9A is a diagram illustrating an example of a preview image according to the second embodiment of the present disclosure.

FIG. 8 is a block diagram illustrating the display processing device 1 according to the second embodiment of the present disclosure.

As illustrated in FIG. 8, the control section 100 further includes a character image searching section 102.

The character image searching section 102 performs searching for a character image included in a preview image 12. The searching starts from a touch location and advances in a prescribed direction. More specifically, in response to a user touching a blank space in the preview image 12, the character image searching section 102 performs searching for a character image included in the preview image 12. The searching starts from the touch location and advances in the prescribed direction. For example, optical character recognition (OCR) is employed for the character image searching.

The image analysis area defining section 103 defines an image analysis area ar stretching from a location of the character image first found by the character image searching section 102.

The display size recognizing section 104 recognizes a display size of a character image included in the image analysis area ar on the touch panel 11. That is, the display size recognizing section 104 recognizes a display size of a character image on the preview image 12 displayed on the touch panel 11. In the present embodiment, the display size of the character image first found by the character image searching section 102 is recognized.

Figure 9B:
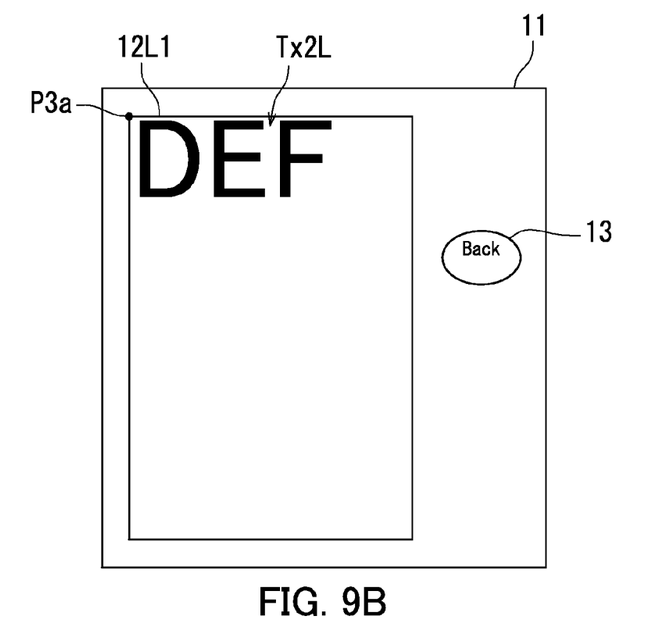
FIG. 9B is a diagram illustrating an example of an enlarged displayed image obtained by enlarging the preview image illustrated in FIG. 9A.

Next, a process to define an image analysis area according to the second embodiment will be described with reference to FIGS. 9A and 9B. FIG. 9A is a diagram illustrating an example of the preview image 12 according to the second embodiment of the present disclosure. FIG. 9B is a diagram illustrating an example of an enlarged displayed image obtained by enlarging the preview image 12 illustrated in FIG. 9A. In order to facilitate understanding, a location P3e is not on an outer edge of the preview image 12 in the example illustrated in FIG. 9A.

In the preview image 12 illustrated in FIG. 9A, a location P3 is in a blank space in the preview image 12. In response to a user touching the location P3 with a finger while the preview image 12 is being displayed on the touch panel 11, the character image searching section 102 performs searching for a character image included in the preview image 12. The searching starts the touch location P3. More specifically, the character image searching section 10 searches for a character image by repeating left-to-right searching starting from the touch location P3 and advancing in the top-bottom direction. In the present embodiment, the character image first found by the character image searching section 102 is a character image "D".

Upon the character image searching section 102 finding the character image "D", the image analysis area defining section 103 defines an image analysis area ar stretching from the upper left of the character image "D" (location P3a) toward the lower right. In the example illustrated in FIG. 9A, the image analysis area ar is a rectangular area, one diagonal line of which is a straight line extending from the upper left of the character image "D" (location P3a) as a starting point toward the lower right at 45 degrees. More specifically, the one diagonal line of the image analysis area ar extends from the location P3a as a starting point to the location P3e as an ending point where a straight line extending from the location P3a toward the lower right at 45 degrees intersects with the outer edge of the preview image 12. Once the image analysis area ar is defined, the display size recognizing section 104 analyzes images within the image analysis area ar. Subsequently, the display size recognizing section 104 recognizes the display size of the character image "D" located closest to the location Pa3 (location serving as the starting point for defining the image analysis area ar).

Once the display size recognizing section 104 recognizes the display size of the character image "D", the magnification determining section 105 determines a magnification so that the character image "D" is displayed in the prescribed size Rh on the touch panel 11. Subsequently, the enlarging and displaying section 106 generates image data for forming an enlarged preview image based on the magnification determined by the magnification determining section 105. The enlarging and displaying section 106 also defines a display area on the enlarged preview image stretching from the upper left of the character image "D" (location Pa3). The enlarging and displaying section 106 then causes the touch panel 11 to display an image of the defined display area (enlarged displayed image) as illustrated in FIG. 9B. In the example illustrated in FIG. 9B, an enlarged displayed image 12L1 is displayed. The enlarged displayed image 12L1 includes a character string image Tx2L in which a character string image "DEF" being a portion of a character string image Tx2L "DEFGH" (see FIG. 9A) is enlarged.

As described above, the display processing device 1 performs searching for a character image starting from the touch location P3 even if there is no character image at or in the vicinity of the touch location P3. The display processing device 1 can display on the touch panel 11 the enlarged displayed image 12L1 based on the display size of the first found character image "D". According to the present embodiment, therefore, the user can visually check the enlarged displayed image obtained by enlarging the character image even by touching a blank space in the preview image 12. The user can therefore display the enlarged displayed image by touching any location on the preview image 12. Such a configuration increases user convenience.

It should be noted that the display processing device 1 according to the second embodiment can be applied to the image forming apparatus 2 as well as the display processing device 1 according to the first embodiment.

The embodiments of the present disclosure have been described with reference to the drawings (FIGS. 1 to 9B) so far. However, the present disclosure is not limited to the above-described embodiments and can be practiced in various ways within the scope without departing from the essence of the present disclosure.

For example, although a user touches the touch panel 11 with a finger in the embodiments of the present disclosure, the user may touch the touch panel 11 with a stylus.

Although the diagonal line of the image analysis area ar extends toward the lower right at 45 degrees according to the description of the embodiments of the present disclosure, the angle of the diagonal line of the image analysis area ar is not limited to 45 degrees. For example, the angle of the diagonal line of the image analysis area ar may be 30 degrees.

Although the image analysis area ar is defined using a diagonal line extending at a predetermined angle in the embodiments of the present disclosure, the method of defining the image analysis area ar is not limited thereto. The image analysis area ar may be defined based on a predetermined location of the ending point of the diagonal line. For example, in a configuration in which a location at the lower right of the preview image 12 is predetermined as the ending point of the diagonal line, the diagonal line of the image analysis area ar is a straight line extending from a location at the upper left of the touch location or the first found character image to the location at the lower right of the preview image 12, and the image analysis area ar is defined based on the straight line.

Although the present disclosure is applied to the electrophotographic image forming apparatus 2 in the embodiments of the present disclosure, the present disclosure can be applied to non-electrophotographic image forming apparatuses such as inkjet image forming apparatuses.

Although the present disclosure is applied to a multifunction peripheral in the embodiments of the present disclosure, the present disclosure can be applied to a copier, a printer, or the like.

What is claimed is:

1. A display processing device comprising:
    a display section having a display surface and configured to display an entirety of a first preview image based on image data;
    a touch location acquiring section configured to acquire a touch location at which a user touches the display surface;
    an area defining section configured to define an image analysis area within the first preview image based on the touch location;
    a display size recognizing section configured to recognize a display size of a character image, the character image being included in the image analysis area defined within the first preview image and displayed in the display size on the display section;
    a magnification determining section configured to calculate a magnification so that the character image is displayed in a specific size on the display section, the magnification determining section calculating the magnification based on the display size and the specific size; and
    an enlarging and displaying section configured to enlarge the first preview image at the magnification to obtain a second preview image and cause the display section to display a portion of the second preview image.

2. The display processing device according to claim 1, wherein
    the image analysis area is a rectangular area having a diagonal line extending from the touch location toward the lower right, the touch location being used as an upper left vertex of the rectangular area.

3. The display processing device according to claim 2, wherein
    the diagonal line extends at an angle of 45 degrees or 30 degrees.

4. The display processing device according to claim 2, wherein
    the diagonal line has an ending point at a predetermined location on the first preview image.

5. The display processing device according to claim 4, wherein
    the ending point of the diagonal line is located on an outer edge of the first preview image.

6. The display processing device according to claim 5, wherein
    the ending point of the diagonal line is located on a lower right vertex of the first preview image.

7. The display processing device according to claim 1, further comprising
    a character image searching section configured to perform searching for a character image included in the first preview image in a situation in which the touch location is included in a blank space in the first preview image, the searching starting from the touch location, wherein
    the image analysis area is a rectangular area having a diagonal line extending from a location of a character image first found by the character image searching section toward the lower right, the location of the first found character image being used as an upper left vertex of the rectangular area.

8. The display processing device according to claim 7, wherein
    the diagonal line extends at an angle of 45 degrees or 30 degrees.

9. The display processing device according to claim 7, wherein
    the diagonal line has an ending point at a predetermined location on the first preview image.

10. The display processing device according to claim 9, wherein
    the ending point of the diagonal line is located on an outer edge of the first preview image.

11. The display processing device according to claim 10, wherein
    the ending point of the diagonal line is located on a lower right vertex of the first preview image.

12. The display processing device according to claim 1, further comprising
    a scrolling recognizing section configured to recognize scrolling operation performed on the display surface, wherein
    the enlarging and displaying section changes a display area of the second preview image in response to the scrolling operation, the display area being an area that is displayed on the display section.

13. An image forming apparatus comprising:
    the display processing device according to claim 1;
    a storage section that stores image data therein; and an image forming section that forms an image based on the image data.

14. A display processing method comprising:

causing a display section to display an entirety of a first preview image based on image data;

acquiring a touch location at which a user touches a display surface of the display section;

defining an image analysis area within the first preview image based on the touch location;

recognizing a display size of a character image, the character image being included in the image analysis area defined within the first preview image and displayed in the display size on the display section;

calculating a magnification so that the character image is displayed in a specific size on the display section based on the display size and the specific size; and enlarging the first preview image at the magnification to obtain a second preview image and causing the display section to display a portion of the second preview image.

* * * * *